Patented May 21, 1935

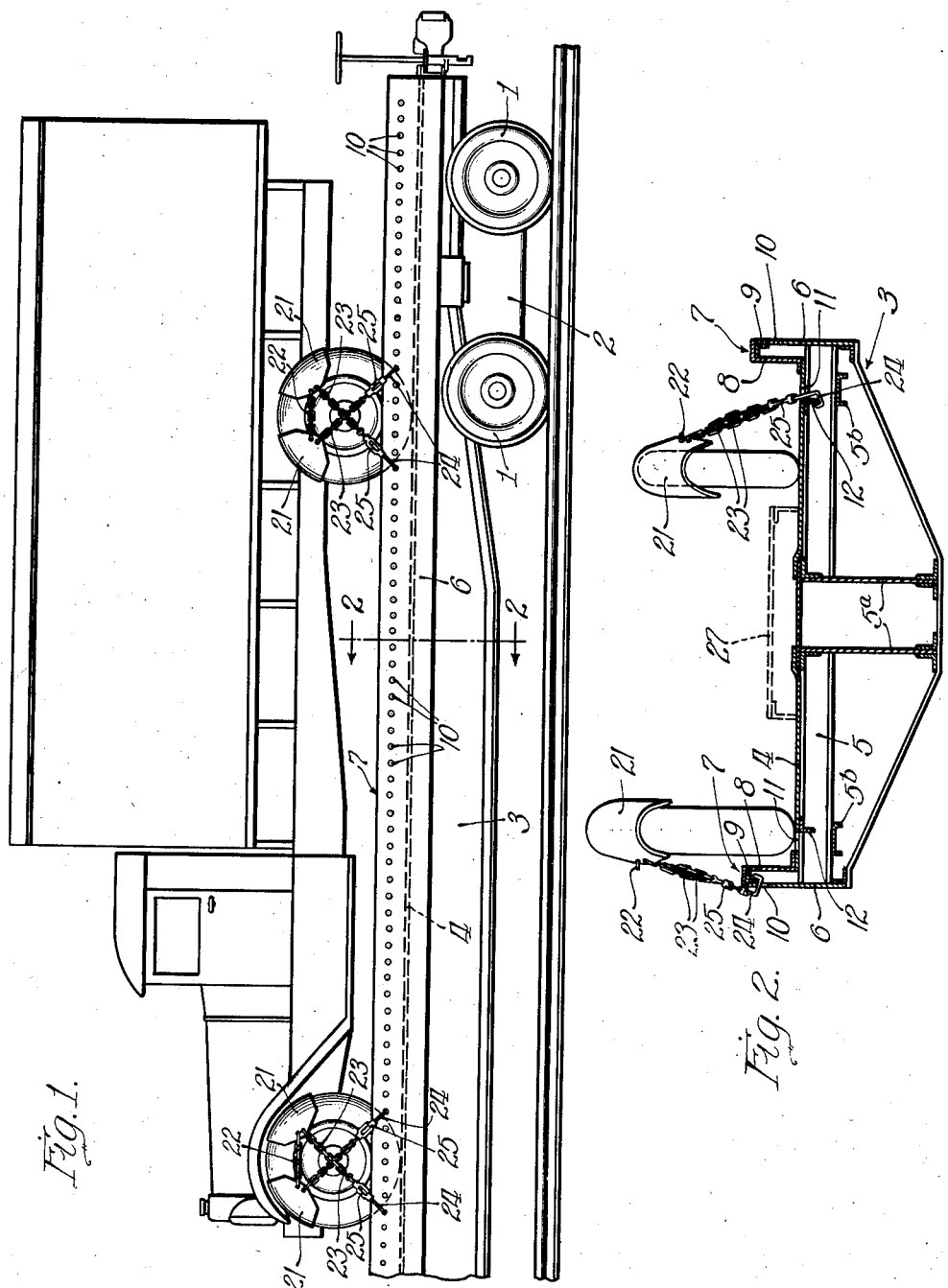

2,001,935

UNITED STATES PATENT OFFICE 2,001,935

TRANSPORTATION MEANS

Harold A. Otis, Glen Ellyn, Ill., assignor to Chicago North Shore & Milwaukee Railroad Company, Chicago, Ill., a corporation of Illinois Original application June 10, 1931, Serial No. 543,258. Divided and this application December 11, 1931, Serial No. 580,237

5 Claims. (Cl. 105—159)

My invention relates to transport means and is more particularly concerned with a track vehicle and fastening means associated therewith for anchoring a road vehicle into place upon said track vehicle for shipment thereon.

It is recognized that railroads are efficient and economical in transporting heavy loads at high speeds and at a high degree of safety and certainty in comparison with many other means of transportation. On the other hand, road vehicles are advantageous because they may travel almost anywhere, and therefore are not restricted to follow definite or fixed lines of travel as are railroads. Needless to say, road vehicles are also advantageous in cities or towns to make deliveries to one or more destinations, as desirable, such vehicles being particularly adapted for that purpose. Moreover, it is known that in combining the above two forms of transportation, the disadvantages of each form are eliminated and the advantages of both forms are retained.

Moreover, to my knowledge, no railroad car has been devised having suitably adjustable means for conveniently and expeditiously anchoring any type of road vehicle thereon with complete safety.

Fundamentally, the main problem involved is to devise a track vehicle which is particularly adapted for conveying road vehicles and which is provided with economical means for anchoring the road vehicle in fixed position relative to the track vehicle within a short space of time. Initially, a track vehicle of this type should be able to accommodate all kinds of road vehicles so as to have unlimited utility. Furthermore, it should not be required or necessary that the road vehicles be made to carry added equipment or to be specially designed in any way for the purpose of transportation on the road vehicle, it being obvious that if either of the foregoing were necessary, the economy and feasibility of the present invention would be somewhat defeated. Briefly, then, the problem is to suit the track vehicle to the road vehicles without regard as to what type or size the latter may happen to be, and inherently to devise a track vehicle which is capable of having the road vehicles quickly secured thereon and quickly releasable therefrom through adjustable fastening means whereby loading and unloading of the road vehicles is expeditiously accomplished.

Accordingly, the main object of my invention is to provide a track vehicle, preferably in the form of a flat car, for suitably receiving one or more road vehicles thereon, and which is equipped with suitable means for firmly securing the road vehicles to the bed thereof, the road vehicles being transported with their own wheels resting upon said bed, yet without interfering with the use of the track vehicle as a conventional flat car.

The provision of a means for securing the road vehicles into transportable position in relation to the track vehicle or flat car presented numerous difficulties. For example, the larger road vehicles such as moving vans or the like have exceedingly low bodies, making it difficult for a man to crawl thereunder for attaching a fastening means to the axles or frames thereof. Then again, somewhat smaller vehicles may have sufficient head room for a man to crawl thereunder to attach suitable fastening means to the frame or axles thereof, but it is apparent that the same means could not be utilized for the larger vehicles for the reasons above noted. Furthermore, the scheme of securing a road vehicle to the bed of a car by providing suitable fastening means for attachment to the frame or axles of the road vehicle is further objectionable for three reasons. First, too much time is required in the process of fastening and unfastening the vehicles to and from the car bed. Second, the fastening means should not only comprise mechanism for holding the wheels of a road vehicle against the bed of a car and to prevent fore and aft movement relative thereto, but should also have the capacity to laterally brace the road vehicle to prevent lateral movement thereof on the car bed. Third, any fastening means that may be permanently located on the bed of the flat car is apt to interfere with the loading and unloading of the road vehicles onto and off of the flat car, and is also likely to interfere with road vehicles having considerably underslung bodies when the latter are being driven or moved into transportable position on the track vehicle. The means which I have devised to overcome the above related difficulties is universally adapted to anchor any type of road vehicle to the car bed, regardless of the wheel base or tread thereof, and regardless of the type of wheels or tires or of the respective dimensions of the same. The particular means of my construction extends between the wheels of the road vehicle and the flat car substantially externally of the sides of the vehicle, and functions to hold the road wheels of the vehicle firmly against the bed of the car to prevent fore and aft movement of the road vehicle and to brace the same laterally to prevent lateral slippage of the vehicle relative to the car, said means being completely adjustable for accommodating all types of road vehicles as will hereinafter appear from the detailed description thereof.

Now, in order to acquaint those skilled in the art with the manner of constructing and operating a device of my invention, I shall describe in connection with the accompanying drawing a specific embodiment of my invention.

In the drawing:—

Figure 1 is a side elevational view of a fragmentary portion of a flat car of my construction illustrating the application of my new and novel fastening means as applied to the wheels of a road vehicle mounted upon the car; and Figure 2 is a transverse vertical sectional view taken substantially along the plane of the line 2—2 in Figure 1.

The flat car and fastening means herein disclosed and described are devised for the same purpose as the construction shown in my co-pending application filed June 10, 1931, bearing the Serial No. 543,258, the subject matter of the present application being a division of the aforesaid application.

The car, in general, comprises track wheels 1 embodied in a suitable truck 2 which may be of standard or any preferred design, the wheels thereof being adapted to run upon the rails of a railroad. The wheels, trucks and rails may be of standard design and standard gauge, or of any preferred construction and gauge. The main body 3 of the car is suitably mounted upon the truck through pivotal connections, such as are well understood by those skilled in the art and which form in themselves no novel feature of the present invention. The body 3 includes a bed or platform 4 adapted as a runway for the road vehicles. The bed may be of any suitable construction but is preferably of steel boiler plate secured by welding, riveting or bolting to the transverse channels 5 of the body carried by the central girders 5a. A pair of longitudinally extending channel irons 5b are secured to the underside of the transverse channels 5 as reinforcement means.

A pair of vertical longitudinally disposed plates 6 are suitably secured to the sides of the body. These plates project considerably above the surface of the bed plates 4 and constitute a part of the longitudinally extending wheel guards 7 which function to prevent the road vehicles from accidentally rolling off of the car when loading and unloading the same therefrom. The balance of each guard structure is composed of a Z-iron 8 which constitutes a reinforcing tie between the plates 4 and 6, and provides the inner wall of the guard 7. Angle irons 9 likewise extend longitudinally of the car and serve as joining elements between the Z-irons 8 and the plates 6 and are also provided for another purpose to be hereinafter described. It is to be understood that all of the aforesaid elements may be securely fastened together in any desired manner, and although welding may be preferable, rivets or bolts will serve for the same purpose.

Referring now more particularly to Figure 2, it is to be noted that the side plates 6 are provided with a plurality of perforations 10 throughout their length, the perforations being so located therein as to clear the bottom edges of the vertical legs of the angle irons 9. Likewise, the bed of the car is also provided with a plurality of perforations 11 disposed substantially along the longitudinal margins of the bed and also throughout the length of the car as best illustrated in Figure 2. The perforations 10 and 11 may be of any suitable size or shape so as to comply with various conditions and uses, and may be located and spaced in any desirable predetermined manner. The bed is further provided with angle irons 12 secured to the underside thereof, the angles extending longitudinally of the car and adjacent the perforations 11 as indicated in Figure 2, the purpose of which being hereinafter explained.

All of the foregoing description relates directly to the construction of the railroad car per se, and the car portrayed thereby is, as it stands, capable of receiving and accommodating not only loads ordinarily transported by railroad, but is particularly devised for the reception of various types of cooperating fastening devices to secure road vehicles to the bed of the car in transportable position, a preferred form of such a fastening device being hereinafter described in detail.

My preferred construction of fastening means comprises a pair of saddles 21 joined by means of a chain 22 or the like, each of said saddles being provided with a chain 23 or other suitable means having a hook 24 connected therewith through adjustable means such as a turnbuckle 25. In securing a road vehicle to the flat car by the aforesaid fastening means, the saddles 21 are placed upon the tire or wheel of the road vehicle in spaced relation to each other as determined by the length of chain 22 which may also be made adjustable as by incorporating turnbuckle means therefor. When the saddles 21 have been positioned upon the tire or wheel, the chains 23 may be crossed in some such fashion as illustrated in Figure 1 and the hooks 24 may then be inserted into certain of the perforations 10 as illustrated in Figure 1. The hooks 24 are ordinarily inserted through the perforations 10 when the fastening device is being utilized for anchoring larger road vehicles upon the flat car. However, if the fastening means is being utilized for anchoring smaller vehicles or vehicles having a narrower tread upon the flat car, the hooks 24 may be inserted into the perforations 11 in the manner best illustrated to the right in Figure 2.

When utilizing a fastening means of the present construction it is desirable to have the chains 23 disposed in such positions as to pass through the axial center of the wheel to eliminate all forces which may tend to turn the wheel and which might act to dislodge the saddles 21 therefrom. This is readily accomplished by inserting the hooks 24 into certain selected perforations 10 or 11, which will so dispose the chains. This method of mounting the saddles is not absolutely essential, however, particularly where the pair of saddles are connected together as by means of the chain 22.

It is evident that only a single saddle may be used for each wheel as the sole fastening by placing the chain either forwardly or rearwardly of the axial center of the wheel and by connecting the tensioning means of the saddle to the car either rearwardly or forwardly of the axial center line of the wheel, respectively. It is also apparent that it is fully possible and within the contemplated scope of the present invention to provide a single chain in place of the chains 22 and 23, by stringing the chain through suitable openings in the saddles similarly located as the openings therein provided for fastening the chains 22 and 23 to the saddles.

It is to be noted that the hook members 24 are of such length and size, that when they are inserted into either the perforations 10 or 11, that the hooks 24 will engage the vertically disposed legs of the longitudinally extending angle irons 9 and 12, respectively. In this manner, the car bed and the guards are reinforced, and tearing of the metal comprising the latter elements will be substantially eliminated.

Although not necessary, the flat car may be provided with a raised center or mound as indicated in dotted lines at 27 to provide a guide for vehicles of smaller tread sizes. Such a mound acts to aid in centering a road vehicle upon the car. The centering of the vehicles will also allow the respective fastening means to be disposed symmetrically, whereby all of the respective means will be subjected to practically the same stresses during transportation.

It is apparent that changes may be made in the specific structural elements in the preferred combination shown which will not depart from the field and scope of the present invention. Therefore, I do not intend to be strictly limited to the specific description and illustrations of the device, but only insofar as the appended claims are so limited.

What I claim is:—

1. In combination, a track vehicle, a wheeled road vehicle on the track vehicle, a saddle structure engaging over the upper portion of a wheel of the road vehicle and extending forward and rearward of the axis of said wheel, and securing means comprising two tension members disposed substantially radially of said wheel and connecting the rearward and forward portions, respectively, of the saddle structure to the track vehicle at points disposed within the width of the wheel, said members being independently secured at their lower ends to said track vehicle, one of said members extending downward and rearward from the forward portion of said saddle structure and the other of said members extending downward and forward from the rearward portion of said saddle structure.

2. In combination, a track vehicle, a wheeled road vehicle on the track vehicle, a saddle structure engaging over the upper portion of a wheel of the road vehicle and extending forward and rearward of the axis of said wheel, and securing means comprising two tension members disposed substantially radially of said wheel and connecting the rearward and forward portions, respectively, of the saddle structure to the track vehicle at points disposed within the width of the wheel, said members being independently secured at their lower ends to said track vehicle, one of said members extending downward and rearward from the forward portion of said saddle structure and the other of said members extending downward and forward from the rearward portion of said saddle structure, said securing members being under tension and one intersecting the other at a point substantially in the vertical plane of the wheel axis.

3. In combination, a track vehicle, a wheeled road vehicle on the track vehicle, a saddle structure engaging over the upper portion of a wheel of the road vehicle and extending forward and rearward of the axis of said wheel, and securing means comprising two tension members disposed substantially radially of said wheel and connecting the rearward and forward portions, respectively, of the saddle structure to the track vehicle at points disposed within the width of the wheel, said members being independently secured at their lower ends to said track vehicle, one of said members extending downward and rearward from the forward portion of said saddle structure and the other of said members extending downward and forward from the rearward portion of said saddle structure, said securing members being under tension and one intersecting the other at a point substantially coincident with the wheel axis.

4. In combination, a track vehicle, a wheeled road vehicle on the track vehicle, a saddle structure engaging over the upper portion of a wheel of the road vehicle and extending forward and rearward of the axis of said wheel, and securing means comprising two tension members disposed substantially radially of said wheel and connecting the rearward and forward portions, respectively, of the saddle structure to the track vehicle at points disposed within the width of the wheel, said members being independently secured at their lower ends to said track vehicle, one of said members extending downward and rearward and outward from the forward portion of said saddle structure and the other of said members extending downward and forward and outward from the rearward portion of said saddle structure.

5. In combination, a track vehicle, a wheeled road vehicle on the track vehicle, a saddle structure engaging over the upper portion of a wheel of the road vehicle and extending forward and rearward of the axis of said wheel, and securing means comprising two tension members disposed substantially radially of said wheel and connecting the rearward and forward portions, respectively, of the saddle structure to the track vehicle, one of said members extending downward and rearward and outward from the forward portion of said saddle structure and the other of said members extending downward and forward and outward from the rearward portion of said saddle structure.

HAROLD A. OTIS.